United States Patent
Hasan (10) Patent No.: US 8,780,699 B1
(45) Date of Patent: *Jul. 15, 2014

(54) HANDLING SWITCHOVER OF MULTI-HOMED CONNECTIONS IN VPLS NETWORKS

(75) Inventor: Safaa Hasan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 505 days.

This patent is subject to a terminal disclaimer.

(21) Appl. No.: 12/577,588

(22) Filed: Oct. 12, 2009

(51) Int. Cl.
*H04L 1/00* (2006.01)
*H04L 1/22* (2006.01)
*H04L 12/40* (2006.01)
*H04L 29/12* (2006.01)
*H04L 29/08* (2006.01)
*H04L 12/24* (2006.01)
*H04L 12/56* (2006.01)
*H04L 29/14* (2006.01)
*G06F 11/20* (2006.01)
*G06F 11/08* (2006.01)

(52) U.S. Cl.
CPC ............ *H04L 1/22* (2013.01); *H04L 12/40182* (2013.01); *H04L 12/40176* (2013.01); *H04L 29/12952* (2013.01); *H04L 61/6077* (2013.01); *H04L 67/1034* (2013.01); *H04L 12/2422* (2013.01); *H04L 49/552* (2013.01); *H04L 69/40* (2013.01); *G06F 11/202* (2013.01); *G06F 11/08* (2013.01); *G06F 11/20* (2013.01)
USPC ........... 370/219; 370/220; 370/224; 370/228; 370/231; 370/395.31; 709/223; 709/224; 709/225; 709/226; 709/228; 709/229; 709/230; 709/231; 709/232; 709/233; 709/234; 709/235

(58) Field of Classification Search
None
See application file for complete search history.

(56) References Cited

U.S. PATENT DOCUMENTS

| 6,813,242 | B1 * | 11/2004 | Haskin et al. ................. 370/229 |
| 7,345,991 | B1 | 3/2008 | Shabtay et al. |
| 7,558,219 | B1 | 7/2009 | Aggarwal et al. |
| 7,715,310 | B1 * | 5/2010 | Sajassi et al. ................. 370/219 |

(Continued)

FOREIGN PATENT DOCUMENTS

FR WO-2008/037918 A1 * 3/2008 .............. H04L 12/56

OTHER PUBLICATIONS

Kompella et al., "Multi-homing in BGP-based Virtual Private LAN Service," Network Working Group, Nov. 3, 2008, 26 pp.

(Continued)

*Primary Examiner* — Faruk Hamza
*Assistant Examiner* — Andrew Oh
(74) *Attorney, Agent, or Firm* — Shumaker & Sieffert, P.A.

(57) ABSTRACT

A method includes establishing a bi-directional pseudowire (BPW) between a first provider edge (PE) router and a second PE router that are forwarders for a multi-homed VPLS customer site associated with a VPLS domain. The first PE router has a designated forwarder status and the second PE router has a backup forwarder status relative to the VPLS customer site. The BPW is established as an auxiliary standby BPW external to the VPLS domain. The method also includes detecting a change in topology of the network with the first PE router, wherein the change in topology affects connectivity by the first PE router to the VPLS customer site associated with the VPLS domain, and, upon detecting the change in topology, utilizing the BPW as an active interface within the VPLS domain for forwarding network traffic to the VPLS customer site.

24 Claims, 7 Drawing Sheets

(56) References Cited

U.S. PATENT DOCUMENTS

| | | | |
|---|---|---|---|
| 8,259,563 B1* | 9/2012 | Kothari et al. | 370/225 |
| 2002/0186654 A1 | 12/2002 | Tornar | |
| 2004/0233891 A1* | 11/2004 | Regan et al. | 370/351 |
| 2006/0171323 A1* | 8/2006 | Qian et al. | 370/252 |
| 2006/0182122 A1* | 8/2006 | Davie et al. | 370/395.53 |
| 2007/0047556 A1* | 3/2007 | Raahemi et al. | 370/395.53 |
| 2007/0091796 A1* | 4/2007 | Filsfils et al. | 370/228 |
| 2007/0159977 A1 | 7/2007 | Dalal et al. | |
| 2007/0183376 A1* | 8/2007 | Arai et al. | 370/338 |
| 2008/0062996 A1 | 3/2008 | Kaippallimalil et al. | |
| 2008/0232384 A1* | 9/2008 | Miyabe | 370/401 |
| 2009/0010258 A1* | 1/2009 | Ayoub et al. | 370/392 |
| 2009/0154339 A1* | 6/2009 | Zi | 370/217 |
| 2009/0164650 A1 | 6/2009 | Taylor et al. | |
| 2009/0245261 A1* | 10/2009 | Khan et al. | 370/395.53 |
| 2009/0274155 A1* | 11/2009 | Nakash | 370/395.53 |
| 2009/0296568 A1* | 12/2009 | Kitada | 370/221 |
| 2010/0008365 A1* | 1/2010 | Porat | 370/392 |
| 2010/0061227 A1* | 3/2010 | Sundt et al. | 370/221 |
| 2010/0085957 A1* | 4/2010 | Elias et al. | 370/352 |
| 2010/0208593 A1* | 8/2010 | Soon et al. | 370/242 |
| 2010/0226246 A1* | 9/2010 | Proulx | 370/228 |
| 2010/0315946 A1* | 12/2010 | Salam et al. | 370/222 |
| 2010/0329110 A1 | 12/2010 | Rose et al. | |
| 2010/0329270 A1* | 12/2010 | Asati et al. | 370/401 |
| 2011/0032945 A1* | 2/2011 | Mullooly et al. | 370/401 |
| 2011/0141945 A1 | 6/2011 | Eriksson | |
| 2011/0176411 A1* | 7/2011 | Niger et al. | 370/218 |

OTHER PUBLICATIONS

Kompella et al., "Virtual Private LAN Service (VPLS)—Using BGP for Auto-Discovery and Signaling," Network Working Group, Jan. 2007, 27 pp.

Wikipedia entry: MC LAG (Multi-Chassis link aggregation group), last modified Aug. 16, 2009, 1 pg.

U.S. Appl. No. 12/246,810, entitled "Inter-Autonomous System (AS) Virtual Private Local Area Network Service (VPLS)," filed Oct. 7, 2008.

U.S. Appl. No. 12/425,503, entitled "Egress Protection for Label Swtiched Paths," filed Apr. 17, 2009.

* cited by examiner

HANDLING SWITCHOVER OF MULTI-HOMED CONNECTIONS IN VPLS NETWORKS

TECHNICAL FIELD

The disclosure relates to computer networks and, more particularly, to layer two virtual private networks (L2 VPNs) established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A virtual private local area network service (VPLS) is one example of a layer two (L2) virtual private network (VPN) service that may be used to extend two or more remote customer networks, i.e., VPLS sites, through an intermediate network (usually referred to as a provider network), such as the Internet, in a transparent manner, i.e., as if the intermediate network does not exist and the remote customer networks are instead directly connected. In particular, the VPLS transports L2 communications, such as Ethernet packets, between customer networks via the intermediate network. In a typical configuration, provider edge (PE) routers coupled the customer networks operate as ingress and egress for label switched paths (LSPs) or other tunnels that may be used as pseudowires within the provider network to carry encapsulated L2 communications as if these customer networks were directly attached to the same local area network (LAN). Such PE routers will be referred to as "members of the VPLS domain" in that they maintain L2 state information for the VPLS service. In Border Gateway Protocol (BGP)-based VPLS networks, the PE routers use BGP as the control plane protocol for signaling the VPLS service.

In some cases, a VPLS site may be given redundant connectivity to a network through multiple PE routers, which is referred to as "multi-homing." In multi-homing, one of the multiple PE routers coupled to the VPLS site is chosen as the "designated forwarder" (DF) to send traffic to and from the VPLS site. The other one or more PE routers are designated as backup forwarders which can be used to send traffic to and from the VPLS site in the event of a network failure that would preclude the current DF from sending the traffic.

SUMMARY

In general, this disclosure is directed to techniques for handling switchover of multi-homed connections in Border Gateway Protocol (BGP)-based virtual private local area network service (VPLS) networks or other layer two (L2) Virtual Private Networks (VPNs). Specifically, this disclosure describes techniques for implementing a time-controlled switchover from a primary to a backup provider edge (PE) router using a standby auxiliary bi-directional pseudowire (BPW) established between the designated forwarder (DF) PE router and the backup PE router.

As described herein, the standby auxiliary BPW is maintained external to the VPLS domain. Upon detection of a link failure, the PE routers connect the BPW to the VPLS domain, thereby quickly redirecting L2 communications through the BPW. Specifically, a forwarding engine of the backup PE router stitches the pre-established BPW to the physical link connected to the customer edge (CE) device for which the multi-homed connection is being provided. The availability of the BPW for sending network traffic upon detection of a failure allows for a faster and more graceful switchover from the DF PE router to the backup PE router to occur in a controlled manner. The techniques described herein provide support for fast reroute during switchover in multi-homed connections in BGP-based VPLS networks, thereby allowing the PE routers to continue delivering network traffic without requiring the network to wait for the BGP signaling to synchronize.

The techniques may provide one or more advantages. For example, the techniques do not rely solely on BGP signaling to handle switchover, but allow for traffic to continue being delivered while the BGP signaling in response to the switchover completes. This may allow the PE routers to continue forwarding L2 VPN traffic in under 50 milliseconds of a switchover event, potentially reducing the impact of the switchover on VPLS site customers. Moreover, the techniques allow the DF and backup PE routers to remain synchronized with each other during the status change. The techniques are also applicable to many different multi-homing scenarios, such as architectures having multiple backup multi-homing routers. The techniques may also be integrated with an end-to-end restoration scheme for node protection. That is, when a node such as the designated forwarder fails, the techniques may be used during switchover to a backup node. The techniques are operable without regard to specific customer edge device configuration, and thus do not rely on any specific assumptions regarding customer edge device interaction. Further, the techniques do not require extensions to the current BGP-based VPLS signaling mechanisms used to establish and control VPLS domains.

In one aspect, a method includes establishing a bi-directional pseudowire (BPW) between a first provider edge (PE) router and a second PE router that are both associated with a multi-homed virtual private local area network service (VPLS) customer site associated with a VPLS domain, wherein the first PE router has a designated forwarder status relative to the VPLS customer site, and wherein the second PE router has a backup forwarder status relative to the VPLS customer site. The BPW is established as an auxiliary standby BPW external to the VPLS domain. The method also includes detecting a change in topology of the network with the first PE router, wherein the change in topology affects connectivity of the first PE router to the VPLS customer site associated with the VPLS domain, and, in response to detecting the change in topology, automatically updating forwarding plane configuration of the first PE router to use the BPW as an active interface within the VPLS domain for forwarding network traffic to the VPLS customer site.

In another aspect, a first PE router includes a packet forwarding engine configured to establish a bi-directional pseudowire (BPW) between the first PE router and a second PE router, wherein the first PE router and the second PE router are both associated with a multi-homed VPLS customer site associated with a VPLS domain. The first PE router has a designated forwarder status relative to the VPLS customer site, and the second PE router has a backup forwarder status relative to the VPLS customer site, and the BPW is established as an auxiliary standby BPW external to the VPLS domain. The first PE router also includes a routing engine configured to detect a change in topology of the network with the first PE router, wherein the change in topology affects connectivity of the first PE router to the VPLS customer site associated with the VPLS domain. The packet forwarding engine is configured to, in response to the routing engine detecting the change in topology, automatically update forwarding plane configuration of the first PE router to use the BPW as an active interface within the VPLS domain for forwarding network traffic to the VPLS customer site.

In yet another aspect, a computer-readable medium includes instructions for causing a programmable processor to establish a bi-directional pseudowire (BPW) between a first PE router and a second PE router that are both associated with a multi-homed VPLS customer site associated with a VPLS domain, wherein the first PE router has a designated forwarder status relative to the VPLS customer site, and wherein the second PE router has a backup forwarder status relative to the VPLS customer site, wherein the BPW is established as an auxiliary standby BPW external to the VPLS domain. The computer-readable medium further includes instructions to cause the programmable processor to detect a change in topology of the network with the first PE router, wherein the change in topology affects connectivity of the first PE router to the VPLS customer site associated with the VPLS domain, and, in response to detecting the change in topology, automatically update forwarding plane configuration of the first PE router to use the BPW as an active interface within the VPLS domain for forwarding network traffic to the VPLS customer site.

In a further aspect, a system includes a first VPLS customer site associated with a VPLS domain providing VPLS services to the VPLS customer site, a first PE router associated with the VPLS customer site, and a second PE router associated with the VPLS customer site. The first PE router and the second PE router provide multi-homed connections for the VPLS customer site to the VPLS domain, and the first PE router has a designated forwarder status relative to the VPLS customer site, and the second PE router has a backup forwarder status relative to the VPLS customer site. The first PE router and the second PE router are configured to establish a bi-directional pseudowire (BPW) between the first PE router and the second PE router, wherein the BPW is established as an auxiliary standby BPW external to the VPLS domain. The first PE router is configured to detect a change in topology of the network that affects connectivity of the first PE router to the VPLS customer site, and, in response to the first PE router detecting the change in topology, the first PE router is configured to automatically update forwarding plane configuration of the first PE router to use the BPW as an active interface within the VPLS domain for forwarding network traffic to the VPLS customer site.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
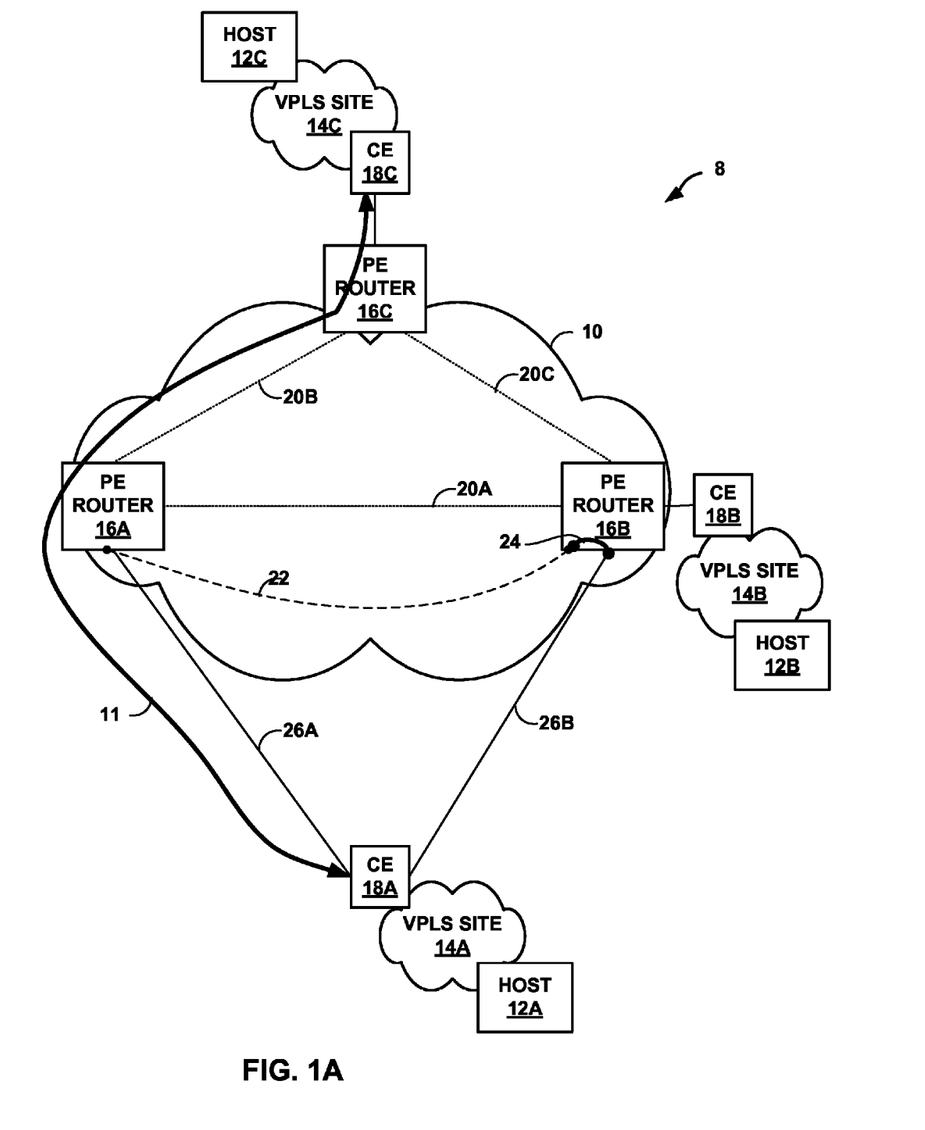
FIGS. 1A-1C are block diagrams illustrating an example service provider (SP) network that includes devices configured to employ controlled switchover of multi-homed connections in a Border Gateway Protocol (BGP)-based virtual private local area network service (VPLS).
Figure 1B:
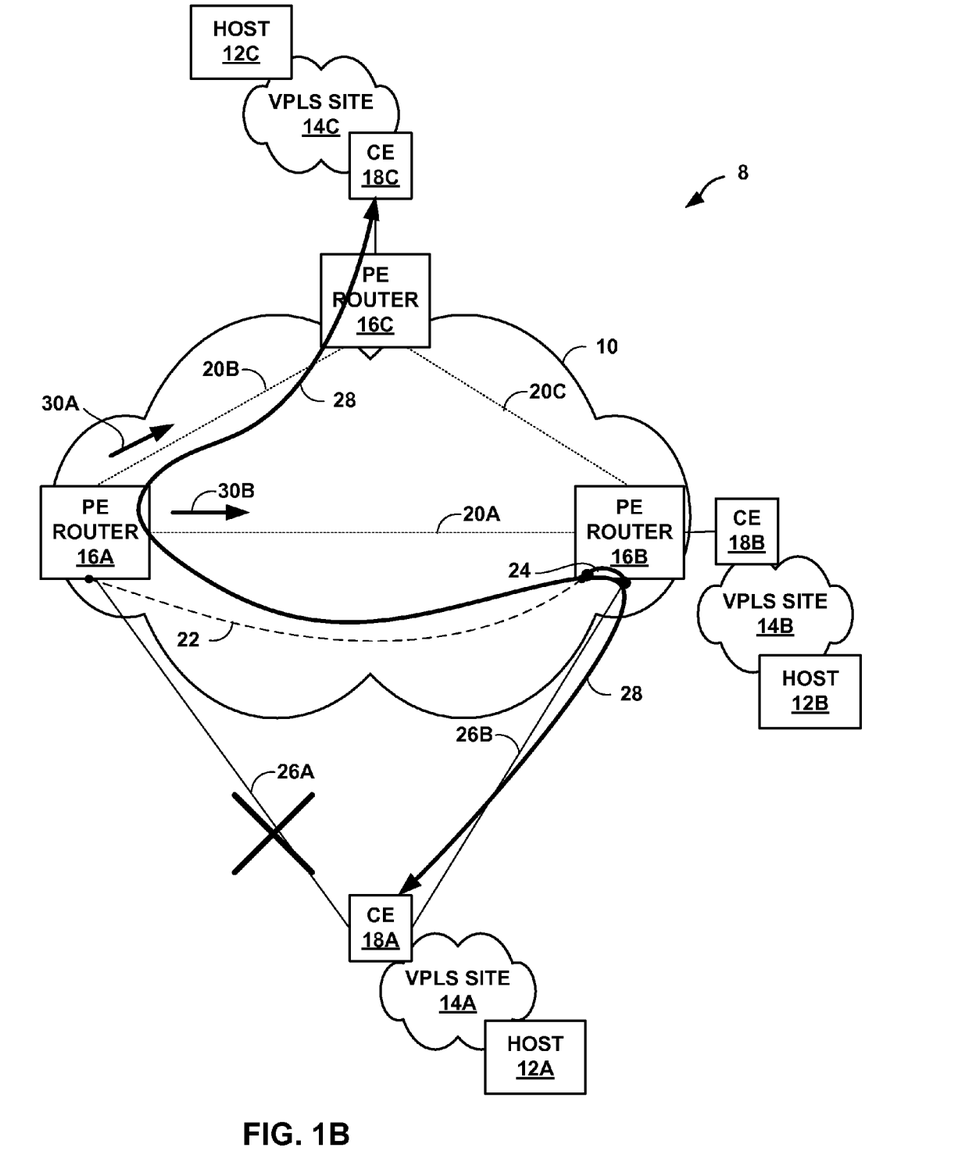
Figure 1C:
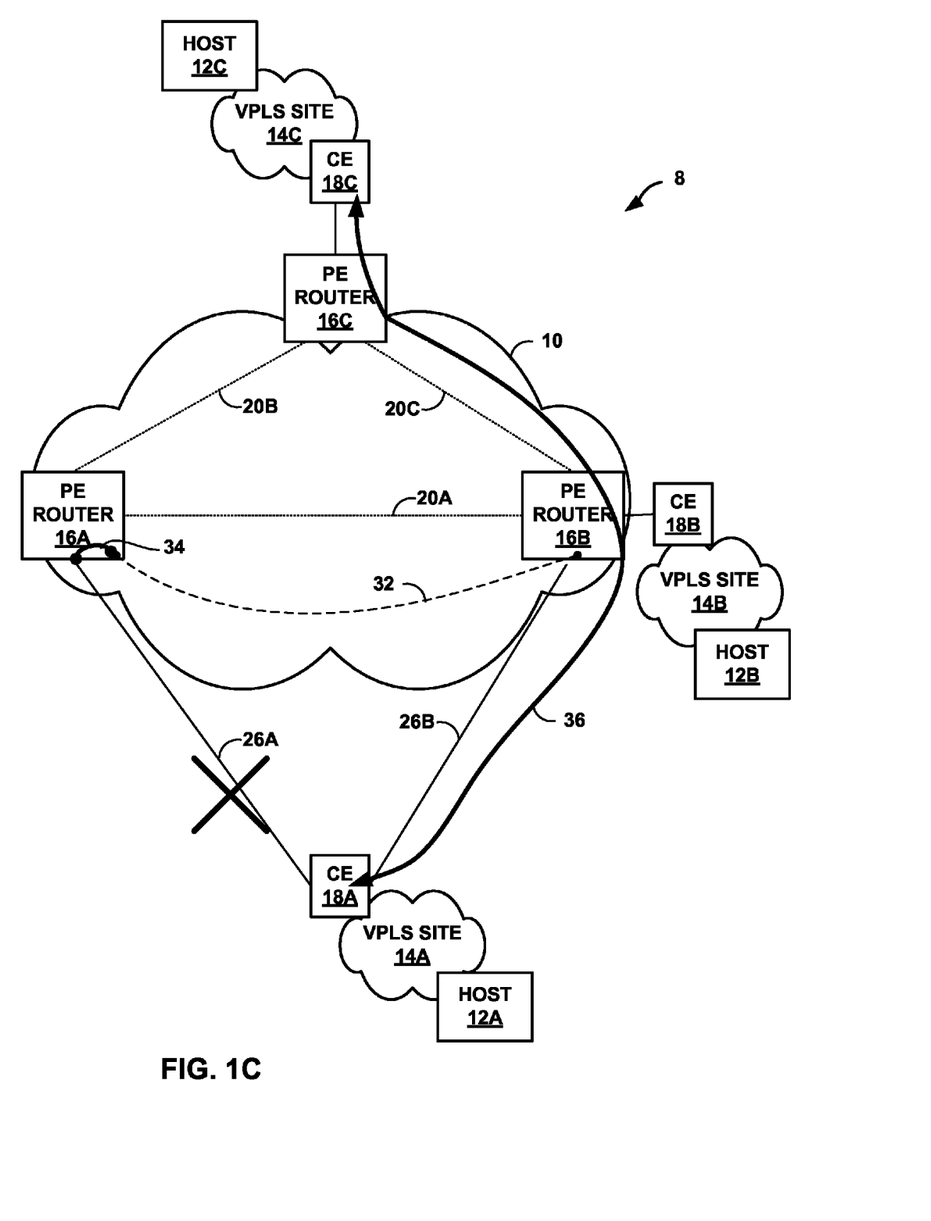

FIGS. 1A-1C are block diagrams illustrating an example system 8 having a service provider (SP) network 10 that includes devices configured to employ controlled switchover of multi-homed connections in a Border Gateway Protocol (BGP)-based virtual private local area network (LAN) service (VPLS). Devices in system 8 are configured to provide VPLS services to VPLS sites 14A-14C ("VPLS sites 14"). A VPLS may be used to extend two or more remote customer networks, e.g., VPLS sites 14, through SP network 10 in a transparent manner, as if SP network 10 does not exist. In particular, the VPLS transports layer two (L2) communications, such as Ethernet packets, between VPLS sites 14 via SP network 10. In a typical configuration, provider edge (PE) routers 16 are coupled to the customer networks by customer edge (CE) routers 18A-18C ("CE routers 18"). Although shown for purposes of example as CE routers, PE routers 16 may in some examples be coupled to VPLS sites 14 by other devices, such as network switches.

The PE routers 16 define label switched paths (LSPs) that may be used as pseudowires within SP network 10 to carry encapsulated L2 communications as if these customer networks were directly attached to the same local area network (LAN). In BGP-based VPLS networks, BGP is used as the control plane protocol for signaling the VPLS service. PE routers 16 that participate in the BGP-based VPLS signaling and maintain L2 state information for the customer sites may be referred to as "members of the VPLS domain." In the example of FIG. 1A, pseudowire (PW) 20A is established to carry communications between PE router 16A and PE router 16B, PW 20B is established to carry communications between PE router 16A and 16C, and PW 20C is established to carry communications between PE router 16B and PE router 16C. PWs 20 may be bi-directional pseudowires. For example, PW 20A may include a PW from PE router 16A to PE router 16B as well as a PW from PE router 16B to PE router 16A.

In the example of FIG. 1A, VPLS site 14A has redundant physical connectivity to SP network 10 through multiple PE routers 16 via links 26A and 26B, a technique which is referred to as "multi-homing." Specifically, VPLS site 14A, via CE router 18A, is multi-homed to SP network 10 through PE routers 16A and 16B. Assume in FIG. 1A that PE router 16A has the DF election in general. As a result, network traffic flows between host 12A, CE router 18A and host 12C, CE router 18C via PE router 16A.

Unlike the case of IP-based multi-homing, in BGP-based VPLS multi-homing only one of PE router 16A and PE router 16B can be actively sending L2 traffic at a given time, either towards CE router 18A or into SP network 10, or else L2 data loops may be introduced into the network. That is to say, load balancing techniques are not used in multi-homing in BGP-based VPLS. In multi-homing, one of the multiple PE routers 16A and 16B is chosen as the "designated forwarder" (DF) to send traffic to and from the VPLS site 14A. The other one or more PE routers 16 are backup forwarders that can be used to send traffic to and from the VPLS site 14A in the event of a network failure that would preclude the current DF from sending the traffic. Additional details on multi-homing in BGP-based VPLS, including how the PE routers 16 determine which among them is the DF, can be found in K. Kompella, "Multi-homing in BGP-based Virtual Private LAN Service," draft-kompella-l2vpn-vpls-multihoming-02.txt, IETF Internet Draft 4761, November 2008, hereby incorporated herein by reference.

Switchover of DF status from PE router 16A to PE router 16B can be triggered in a variety of scenarios, including, for example, an active link failure, an old active link restore, an active PE node crash, failure or restore of an interface card or port associated with the active link, a multi-homing site priority's administrative change, or other scenarios. In an example of an active link failure scenario, connectivity from PE router 16A to VPLS site 14A is lost due to failure of link 26A (the active link). This triggers the switchover process, described in further detail below, from PE router 16A as the DF to PE router 16B as the DF. After switchover in this scenario, link 26B between PE router 16B and CE router 18A becomes the active link. In an old active link restore scenario, switchover may be triggered from PE router 16B as the DF to PE router 16A as the DF when link 26A is subsequently restored, and PE router 16A is capable to serve as the DF again. In an active PE node crash scenario, an active PE router such as PE router 16A may become inoperable. In a multi-homing site priority's administrative change scenario, PE router 16A may detect that PE router 16A has lost the Designated Forwarder election for VPLS site 14A, e.g., due to an administrative change to multi-homing priority settings. In the example of FIG. 1A, these scenarios trigger a switchover of the Designated Forwarder election between PE router 16A and PE router 16B. PE routers 16 may be notified of the loss of connectivity or loss of Designated Forwarder election through the exchange of BGP control messages or other mechanisms.

The effect of such topology changes is that L2 state information previously learned by PE routers 16 of the VPLS domain regarding Media Access Control (MAC) addresses for VPLS site 14A as being reachable through PE router 16A is no longer current. In BGP-based VPLS operation, when PE router 16A detects a loss of connectivity or loss of DF election, PE router 16A sends to its BGP peers a BGP control message having a Down bit ("D-bit") notification. In conventional BGP-based VPLS operation, when a PE router receives the D-bit notification, the PE router flushes all MAC state learned from the sending PE router. If a link such as link 26A "flaps" (i.e., goes up and down repeatedly in a short time span), the DF election will pass repeatedly from PE router 16A to PE router 16B, and this will trigger repeated flushing of MAC state. This churn in the core of SP network 10 tends to consume a large amount of resources, which is typically undesirable. In addition, network traffic may be lost during the switchover process. The longer the switchover process takes, the more network traffic may be lost. Temporary loops may also occur in system 8 while switchover is being undertaken. Certain aspects of conventional switchover may also result in a phenomenon referred to as "double count," where a device such as CE router 18A may erroneously receive two copies of the network traffic.

In accordance with one embodiment of the invention, prior to occurrence of any switchover event, the PE router 16 having DF status pre-establishes an auxiliary bi-directional pseudowire (BPW) between the DF and the backup PE router (s) for the multi-homed VPLS site 14A. As shown in FIG. 1A, BPW 22 is established within SP network 10 between PE router 16A and PE router 16B. In this case, BPW 22 is a pseudowire that is isolated from the VPLS domain. That is, in the "steady state" configuration prior to any switchover, BPW 22 is not part of a VPLS domain in that it is not associated with any active links with which the L2 state of the VPLS domain is currently associated. BPW exists in addition to the VPLS PWs 20A-20C. BPW 22 is specific to VPLS site 14A. PE router 16A establishes BPW 22 as part of an infrastructure for fast reroute of traffic after a link failure. PE routers 16A and 16B use BPW 22 in performing the DF/backup transition in a controlled sequence of events, as described in further detail below. SP network 10 may be configured with other BPWs (not shown) that exist specifically for other multi-homed VPLS sites.

FIG. 1A illustrates system 8 in an initial state in which network traffic 11 is forwarded between a host device 12C within a first VPLS site 14C and a host device 12A within a second VPLS site 14A. PE router 16A has the designated forwarder election, and PE router 16B is the backup forwarder. BPW 22 has been established between PE routers 16A and 16B, but BPW 22 is not currently seen by PE routers 16A and 16B as part of the VPLS domain. For example, BPW 22 is not used to carry L2 traffic and is not considered when PE routers 16A, 16B perform MAC learning and updating of VPLS state data for the VPLS domain. PE router 16B stitches auxiliary BPW 22 to link 26B, which is currently inactive with respect to L2 traffic for the VPN. Specifically, PE router 16B stitches the interface for link 26B to BPW 22, but the link is currently designated as an inactive link in the VPLS domain. PE router 16B is configured not to conduct VPLS learning in response to any traffic on the BPW 22. Any VPLS traffic to or from CE router 18A (e.g., via PW link 26A) is isolated from the backup PE router 16B's VPLS domain. Further, any VPLS traffic carried via PW link 26A is also isolated from BPW 22. When stitched together, as isolated from the VPLS, the combined "BPW 22-link 26B" can be thought of as a hot standby reroute link for link 26A. The logical association and mapping of link 26B to BPW 22 is illustrated in FIG. 1A as "stitching" 24 within PE router 16B.

From the perspective of PE router 16A, as the DF, BPW 22 is managed as another active CE interface working as a backup to the active CE interface to CE router 18A. Because BPW 22 is stitched to link 26B, link 26B is viewed as terminating at PE router 16A rather than terminating at PE router 16B. As a result, any traffic coming from CE router 18A on link 26B is dropped on PE router 16A, rather than on PE router 16B.

FIG. 1B illustrates system 8 in a second state in which active link 26A has failed, but, as far as the other PE routers in SP network 10 are concerned, at this time PE router 16A still has the status of designated forwarder for VPLS site 14A. The time at which PE router 16A becomes aware of the unavailability of link 26A is denoted T=0, and marks the beginning of a first time period in the proposed controlled sequence of events during switchover. PE router 16A maintains a timer having a given duration, during which PE router 16A would like the backup router to wait before breaking its stitching to BPW 22. PE router 16A advertises its timer to PE router 16B, the backup forwarder. Upon receipt of the advertised timer, PE router 16B overrides its own maintained timer to reflect the time period specified by the advertised timer. This ensures that the designated forwarder and the backup forwarder have synchronized timers. When PE router 16A detects the unavailability of link 26A, PE router 16A immediately switches the VPLS traffic to BPW 22 by stitching the BPW 22 to the VPLS. That is, PE router 16A immediately begins using the hot standby reroute link of "BPW 22-link 26B" for sending VPLS traffic to CE router 18A. In some examples, rerouting the traffic from link 26A to the hot standby reroute "link" in this manner may take on the order of five to ten milliseconds. As a result, L2 traffic may only be dropped during this five to ten millisecond interval.

PE router 16A also announces an active dummy site, e.g., with "id 1" to its BGP peers. The announcement of the dummy site ensures that the remote PE router 16C will not drop PW 20B to PE router 16A. PE router 16A starts its timer, and will withdraw the announcement of the dummy site 1 after 2*T1 seconds have elapsed, i.e., two expirations of the timer. When PE router 16C receives the announcement of the active dummy site 1, PE router 16C flushes its learned MAC addresses, begins the VPLS flooding and learning.

Also upon becoming aware of the unavailability of link 26A, PE router 16A initiates BGP signaling messages by sending D-bit advertisements 30A-30B to PE router 16C and PE router 16B, respectively. The D-bit advertisements 30 are BGP control messages in which a Down bit (referred to as a "D-bit") is set. As shown in FIG. 1B, traffic 28 flows between VPLS sites 14A and 14B through PE router 16A, BPW 22 and link 26B even while this control plane signaling is occurring. In this manner, PE router 16A uses the hot standby reroute link of "BPW 22-link 26A" to continue forwarding the network traffic while the BGP signaling takes place. If a PW is not already established to PE router 16B when PE router 16C receives the D-bit advertisement 30A from PE router 16A, PE router 16C establishes PW 20C to PE router 16B.

When PE router 16B receives the D-bit advertisement 30B from PE router 16A, PE router 16B determines that PE router 16B now has the DF election. In response to this determination, PE router 16B goes into a wait time for a window having duration of T1 seconds. After T1 seconds have elapsed, PE router 16B breaks the stitching 24 to BPW 22 and connects link 26B to the VPLS as the active link for traffic to and from VPLS site 14A, which again minimizes loss of any L2 traffic. At this time, PE router 16B blocks traffic to and from BPW 22. As shown in FIG. 1C, traffic 36 between VPLS site 14A and VPLS site 14C can now flow directly through PE router 16B, over PW 20B and link 26B. PE router 16A sends an advertisement to its peers withdrawing the dummy site that had previously been advertised. After PE router 16C receives the withdrawal advertisement, and if no other VPLS sites 14 are connected to SP network 10 by PE router 16A, PE router 16C may drop PW 20B to PE router 16A.

After 2*T1 seconds have elapsed since PE router 16A detected the failure, PE router 16A removes the dummy site 1, e.g., by sending an update message to neighboring routers indicating the removal. Upon receiving the dummy site 1 removal message, PE router 16C flushes MAC state associated with the dummy site 1.

PE router 16B also establishes a new BPW 32 to PE router 16A. As also shown in FIG. 1C, PE router 16A blocks traffic to/from the interface to CE router 18A and stitches the interface for BPW 32 to the interface to CE router 18A using stitching 34. In this way, "BPW 32-link 26A" will function as a hot standby reroute link to now-active link 26B. Subsequently, link 26A may be restored. PE routers 16A and 16B then go through a similar controlled sequence of steps during transfer to DF status from PE router 16B to PE router 16A, and a new sequence of controlled switchover events begins on PE router 16B, which PE router 16B may advertise to PE router 16A.

Figure 2:
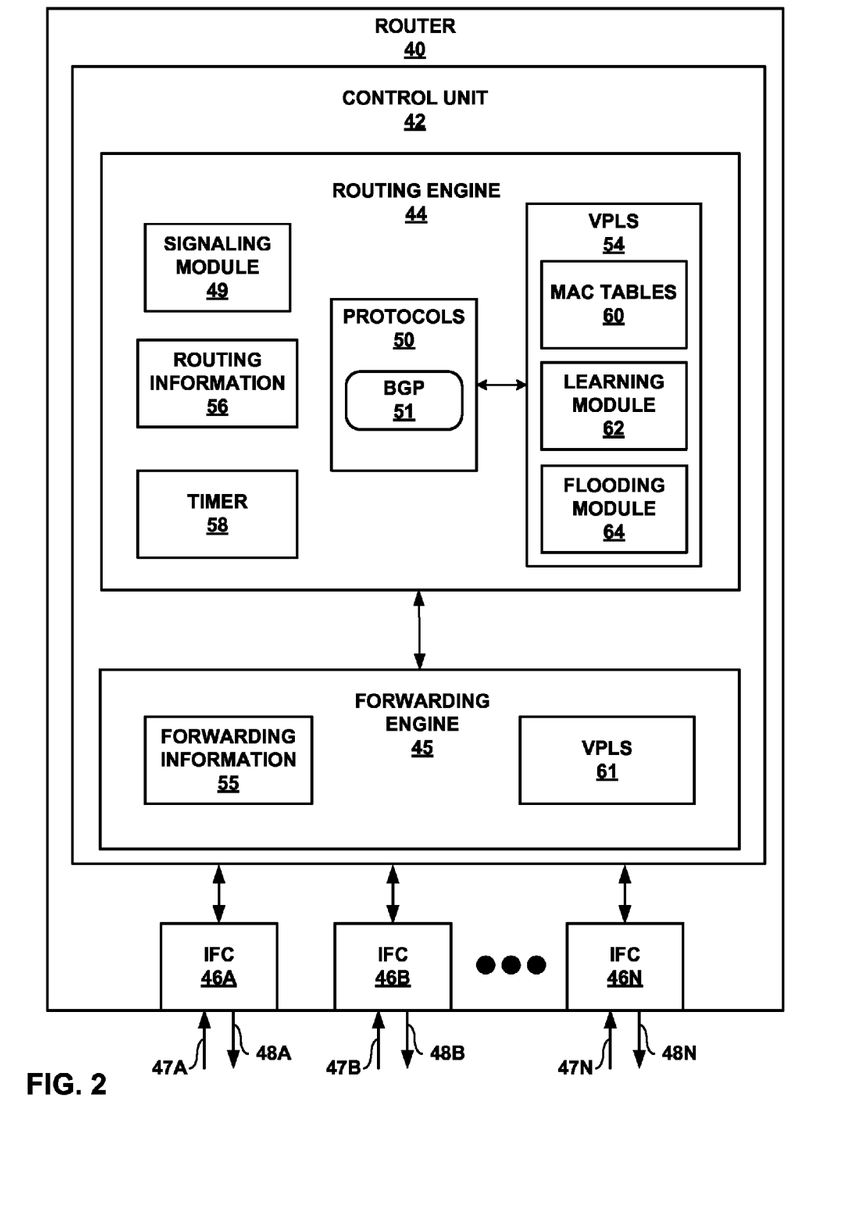
FIG. 2 is a block diagram illustrating an example router configured to perform controlled switchover of multi-homed connections as described herein.

FIG. 2 is a block diagram illustrating an example router 40 configured to perform controlled switchover of multi-homed connections as described herein. For example, router 40 may comprise any of routers 16 of FIG. 1. Router 40 includes a control unit 42 that includes a routing engine 44 coupled to a forwarding engine 45. Router 40 includes interface cards 46A-46N ("IFCs 46") that receive packets via inbound links 47A-47N ("inbound links 47") and send packets via outbound links 48A-48N ("outbound links 48"). IFCs 46 are typically coupled to links 47, 48 via a number of interface ports (not shown). Inbound links 37 and outbound links 38 may be physical interfaces.

Routing engine 44 provides an operating environment for various protocols that execute at different layers of a network stack. The protocols may be software processes executing on one or more processors. For example, routing engine 44 includes network protocols that operate at a network layer of the network stack. In the example of FIG. 2, network protocols include the Border Gateway Protocol (BGP) 51, which is a routing protocol. Routing engine 44 may include other protocols not shown in FIG. 2. Routing engine 44 is responsible for the maintenance of routing information 56 to reflect the current topology of a network and other network entities to which router 40 is connected. In particular, routing protocols periodically update routing information 56 to accurately reflect the topology of the network and other entities based on routing protocol messages received by router 40.

Forwarding engine 45 represents hardware and logic functions that provide high-speed forwarding of network traffic. Forwarding engine 45 typically includes a set of one or more forwarding chips programmed with forwarding information that maps network destinations with specific next hops and the corresponding output interface ports. In general, when router 40 receives a packet via one of inbound links 37, forwarding engine 45 identifies an associated next hop for the data packet by traversing the programmed forwarding information based on information within the packet. Forwarding engine 45 forwards the packet on one of outbound links 38 mapped to the corresponding next hop in accordance with the forwarding information 55.

In the example of FIG. 2, forwarding engine 45 includes forwarding information 55. In accordance with routing information 56, forwarding engine 45 maintains forwarding information 55 that associates network destinations with specific next hops and corresponding interface ports. For example, routing engine 44 analyzes routing information 56 and generates forwarding information 55 in accordance with routing information 56. Forwarding information 55 may be maintained in the form of one or more tables, link lists, radix trees, databases, flat files, or any other data structures.

Forwarding engine 45 maintains forwarding information 55 for each VPLS established by router 40 to associate network destinations with specific next hops and the corresponding interface ports. In general, when router 40 receives a data packet on a pseudowire of a given VPLS via one of inbound links 47, forwarding engine 45 identifies an associated next hop for the data packet by traversing forwarding information 53 based on information (e.g., labeling information) within the packet. Data plane 34 forwards the data packet on one of outbound links 48 to the corresponding next hop in accordance with forwarding information 55 associated with the VPLS. At this time, data plane may push and/or pop labels from the packet to forward the packet along a correct pseudowire.

Control unit 42 also includes a VPLS module 54 having flooding module 64 that performs flooding and a learning module 62 that performs layer two (L2) learning, e.g., learning of customer device MAC addresses from inbound PWs and association of those customer MAC addresses with corresponding outbound PWs and output interfaces. VPLS module 54 may maintain MAC tables 60 for each VPLS instance established by router 40. Learning module 62 and flooding module 60 may alternatively reside within forwarding engine 45.

Signaling module 49 outputs control-plane messages to automatically establish pseudowires between router 40 and each of the PE routers in the AS based on a location table associated with the VPLS. Signaling module 49 may signal the PE routers using a label distribution protocol, such as the Label Distribution Protocol (LDP). Signaling module 49 then communicates with VPLS module 61 of forwarding engine 45 to automatically update a pseudowire table associated with the VPLS within VPLS module 61.

VPLS module 61 lies in the data plane of router 40 and performs MAC address learning to automatically update portions of forwarding information 55 for each VPLS established by router 40. As part of forwarding engine 45, VPLS module 61 is invoked when router 40 receives data packets on the pseudowires (PWs) established by router 40 for any of the PE routers in the first AS or the second AS that are members of the VPLS. VPLS module 61 performs MAC address learning and updates the one of MAC tables 60 associated with the VPLS to initially record associations between the PWs connected to router 40 and the source MAC addresses of the VPLS customer devices from which the data packets were received on the PWs. For example, the one of MAC tables 60 records PW numbers that identify the PWs connected to router 40 and records MAC addresses that identify the source customer devices attached to the first AS of the data packets transmitted over the PWs. In effect, router 40, a L3 routing device, learns associations between MAC address and pseudowires (which are mapped to ports), much as a L2 switch learns associations between MAC addresses and ports. Forwarding information 55 may represent a virtual port binding and bridging table. In this sense, the router is acting as a virtual L2 switch to provide VPLS service.

In order to update the one of the MAC tables 60, learning module 62 of VPLS module 54 in routing engine 44 performs L2 learning and association of L2 customer MAC addresses with specific PWs. Learning module 62 then communicates information recorded in the one of MAC tables 60 that is associated with the VPLS instance to VPLS module 61 in forwarding engine 45. In this way, VPLS module 61 may be programmed with associations between each PW and output interface and specific source customer MAC addresses reachable via those PWs. VPLS module 61 updates the one of MAC tables 62 associated with the VPLS to associate the customer MAC addresses with the appropriate outbound PW. In some examples, VPLS module 61 may maintain local MAC tables 62 (not shown). After the update, the one of MAC tables 62 associated with this particular VPLS instance records associations between the PWs connected to router 40 that are used to transport L2 traffic to the MAC addresses of the customer devices within the VPLS sites of the VPLS instance. In other words, the one of MAC tables 62 for this VPLS instance records associations between the PWs and the network devices to which data packets may be sent on the PWs. For example, the one of MAC tables 62 records PW numbers that identify the PWs sourced by router 40, and for those PW numbers identifies the MAC addresses of the reachable customer devices within the VPLS instance.

VPLS module 61 receives data packets on inbound links 47 that are destined for one of the PE routers in the AS that are members of the VPLS. VPLS module 61 determines whether the destination customer MAC address of the data packets is included in the one of MAC tables 62 associated with the VPLS. If the MAC address is included in the one of MAC tables then router 40 forwards the data packets to the destination PE router on the PW associated with the MAC address based on forwarding information 55 associated with the VPLS. If the customer MAC address is not included in the one of MAC tables 62, flooding module 54 floods the data packets to all of the PE routers in the AS via the PWs based on forwarding information 55 associated with the VPLS. Example details on MAC learning by a router within a VPLS domain are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

In one example, router 40 may function as a designated forwarder (DF) for a multi-homed VPLS site 14. In accordance with the principles of the invention, as the DF, router 40 establishes an auxiliary bi-directional pseudowire (BPW) between router 40 and one or more backup PE routers for the multi-homed VPLS site 14. BPW serves as a hot standby reroute link for a currently active link to the CE router 18 associated with the VPLS site 14.

A trigger may occur that triggers a transient state in router 40 from DF to backup. For example, the trigger may be a CE router interface drop, e.g., due to a failure of a link such as link 26A. Upon detecting the CE router interface drop, router 40 starts the status-changing process. Forwarding engine 45 enters the transient window by blocking the CE interface and logically stitching the BPW 22, being the hot standby CE interface, to the VPLS. That is, router 40 immediately begins using the hot standby reroute link of "BPW 22-link 26B" for sending VPLS traffic to CE router 18A. VPLS modules 54 and 61 keep MAC learning functional for packets that are forwarded to and from BPW 22 during the failover transient window. In the control plane, BGP module 51 advertises an active dummy site during the switchover process to its peer PE routers to ensure that a PW needed to carry out the switchover is not torn down. BGP module 51 generates a D-bit advertisement that is output to peer PE routers by forwarding engine 45 to notify the peer PE routers of the CE router interface drop.

In some examples, router 40 may function as a backup forwarder for a multi-homed VPLS site. During transition from backup status to DF status, VPLS module 54 isolates CE traffic from the VPLS of router 40. Because of the fact that router 40 had stitched the BPW to the CE link towards the multi-homed VPLS site, packets over BPW 22 are forwarded back-to-back to or from the CE link by forwarding engine 45 with no MAC learning by VPLS module 61. BGP module 51 receives an indication of a DF status change, e.g., by receiving a D-bit advertisement from the previous DF router where router 40 has the next highest priority. After receiving the D-bit advertisement, router 40 enters a transient window during which router 40 waits for a time period T1 before proceeding. BGP module 41 may start timer 46 to mark the transient window. Further, where router 40 is a designated forwarder BGP module 41 may output a timer advertisement to advertise the timer (e.g., the length of time associated with timer 46) to the appropriate backup forwarders. At the end of the transient window time period, router 40 breaks the stitching to the BPW, and the CE interface is connected to the VPLS as the active interface.

In some examples, router 40 may be a remote PE router, such as PE router 16C of FIGS. 1A-1C. In this case, upon BGP module 51 receiving an announcement of an active dummy site 1 from a BGP peer, VPLS module 44 flushes MAC table 60 and begins VPLS MAC flooding. VPLS modules 44 and 61 keep this state for the whole transient period. At the conclusion of the switchover, VPLS modules 44 and 61 receive an announcement removing the dummy site 1 from the old DF PE router, and flush MAC state from the dummy site 1. Upon BGP module 51 receiving a D-bit advertisement from a BGP peer, BGP module may establish a VPLS pseudowire to the new designated forwarder, if such pseudowire is not already established.

Problems with CE link flapping in conventional systems may cause VPLS core churn of DF status changes and MAC flushing and relearning. These problems can be mitigated by configuring router 40 with an added delay on the notification put out by router 40 that a CE link has been dropped. The delay period may be, for example, between 500-1000 ms long, e.g., 800 ms. At the end of the delay period, router 40 re-examines the status of the CE link prior to announcing the failure to the other PE routers. During this delay time, the VPLS traffic is sent over the BPW, so that traffic is not dropped during this time. This may help reduce VPLS core churn.

The techniques described herein do not require any modifications to BGP signaling for the VPLS. If a PE router configured as described herein encounters another PE router that does not support this feature, the configured PE router operates according to the conventional operation.

The architecture of router 40 illustrated in FIG. 2 is shown for exemplary purposes only. The disclosure is not limited to this architecture. In other embodiments, router 40 may be configured in a variety of ways. In one embodiment, for example, some of the functionally of routing engine 44 and forwarding engine 45 may be distributed within IFCs 46.

Elements of control unit 42 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 42 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 40, e.g., protocols. Control unit 42, in some examples, retrieves and executes the instructions from memory for these aspects.

Figure 3:
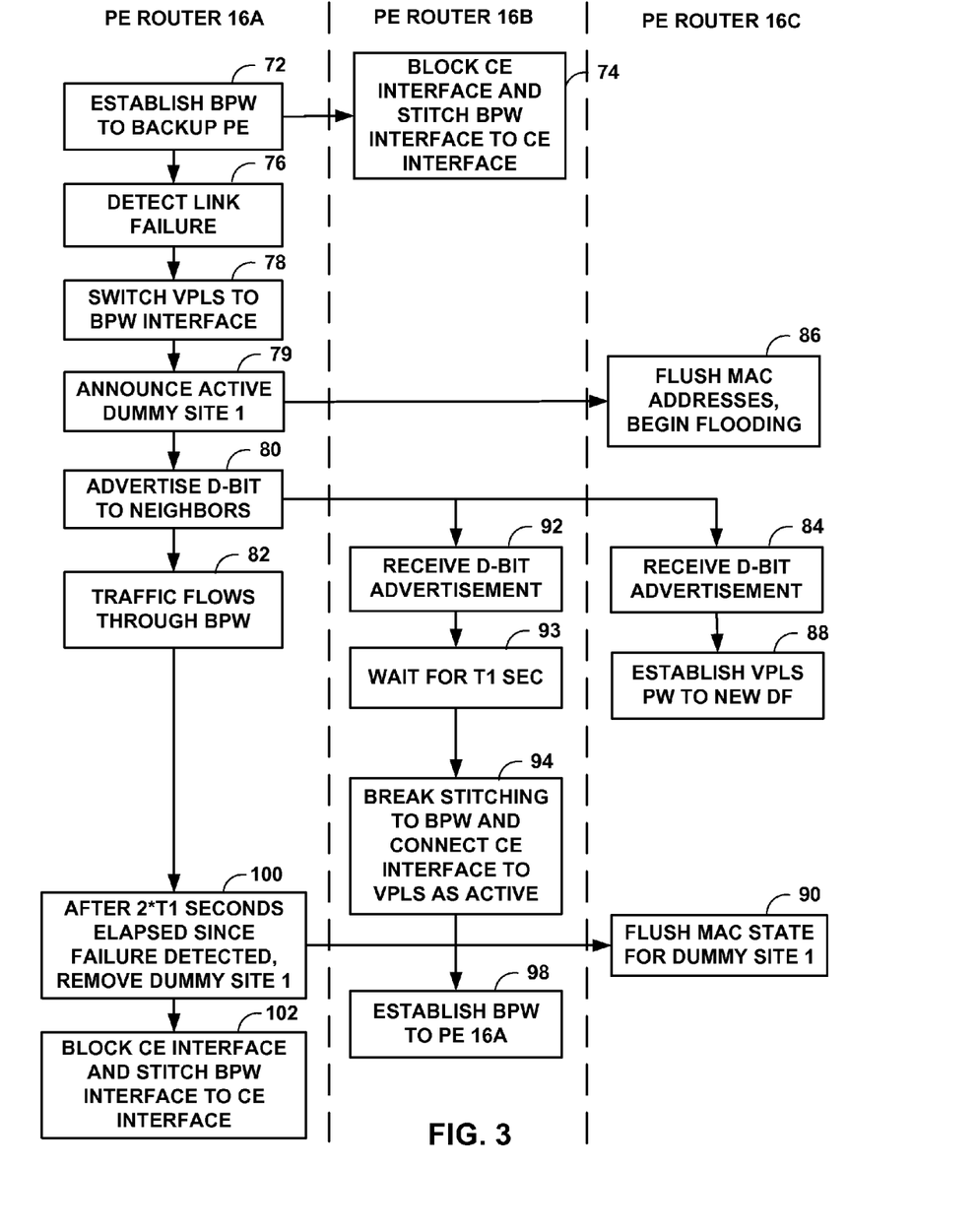
FIG. 3 is a timing diagram illustrating example operation of network devices in an SP network in carrying out a controlled switchover of multi-homed connections in a BGP VPLS.

FIG. 3 is a timing diagram illustrating example operation of network devices in an SP network in carrying out a controlled switchover of multi-homed connections in a BGP VPLS. Reference will be made to FIGS. 1A-1C in describing FIG. 3. The SP network 10 exists in an initial state in which network traffic 11 is forwarded between a host device 12C within a first VPLS site 14C and a host device 12A within a second VPLS site 14A. PE router 16A has the designated forwarder election, and PE router 16B is the backup forwarder. PE router 16A establishes BPW 22 between PE routers 16A and the backup PE routers for multi-homed VPLS site 14A, i.e., PE router 16B in this case (72). PE router 16B blocks the CE interface from the VPLS and stitches auxiliary BPW 22 to the interface for link 26B (74). Because the CE interface is blocked from the VPLS, traffic to or from CE router 18A is isolated from the backup PE router 16B's VPLS and no MAC learning occurs for this interface. When stitched together, as isolated from the VPLS, the combined "BPW 22-link 26B" can be thought of as a hot standby reroute link for link 26A.

At some subsequent time, PE router 16A becomes aware of the unavailability of link 26A. The time at which PE router 16A becomes aware of the unavailability of link 26A is denoted T=0, and marks the beginning of a first time period in the proposed controlled sequence of events during switchover. At time T=0, as far as the other PE routers in SP network 10 are concerned, PE router 16A still has the status of designated forwarder for VPLS site 14A. When PE router 16A detects a failure of link 26A (76), for example, the forwarding plane of PE router 16A immediately switches the VPLS traffic to BPW 22 (78). That is, PE router 16A immediately updates forwarding information to begin using the hot standby reroute "link" of "BPW 22-link 26B" for sending VPLS traffic towards CE router 18A by utilizing BPW 22 as an active interface within the VPLS domain for forwarding network traffic to CE router 18A. PE router 16A also announces an active dummy site 1 to neighboring PE routers (79). When PE router 16C receives the announcement of the active dummy site 1, PE router 16C flushes its learned MAC addresses, begins the VPLS flooding and learning (86).

Also upon becoming aware of the unavailability of link 26A, the control plane of PE router 16A sends D-bit advertisements 30A-30B to PE router 16C and PE router 16B, respectively (80). The D-bit advertisements 30 are BGP control messages in which the down-bit ("D-bit") is set. As shown in FIG. 1B, traffic 28 flows between VPLS sites 14A and 14B through BPW 22 and link 26B (82). In this manner, PE router 16A uses the hot standby reroute link of "BPW 22-link 26A" to continue forwarding the network traffic to minimize dropped traffic while the BGP signaling takes place.

When PE router 16C receives the D-bit advertisement 30A from PE router 16A (84), if a PW is not already established to PE router 16B, PE router 16C establishes PW 20C to PE router 16B (88).

When PE router 16B receives the D-bit advertisement 30B from PE router 16A, PE router 16B determines that PE router 16B now has the DF election. In response to this determination, PE router 16B goes into a wait time for a window having duration of T1 seconds (93). After T1 seconds have elapsed, PE router 16B breaks the stitching 24 to BPW 22 and connects link 26B to the VPLS as the active link for traffic to and from VPLS site 14A (94). PE router 16B blocks traffic to and from BPW 22 (96). Traffic 34 between VPLS site 14A and VPLS site 14C can now flow directly through PE router 16B, over PW 20B and link 26B, as shown in FIG. 1C. PE router 16B also establishes a new BPW 32 to PE router 16A (98).

After 2*T1 seconds have elapsed since PE router 16A detected the failure, PE router 16A removes the dummy site 1 (100), e.g., by sending an update message to neighboring routers indicating the removal. Upon receiving the dummy site 1 removal message, PE router 16C flushes MAC state associated with the dummy site 1 (90). Now having backup status, PE router 16A blocks traffic to/from the interface to CE router 18A and stitches the interface for BPW 32 to the interface to CE router 18A using stitching 34 (102). In this way, "BPW 32-link 26A" will function as a hot standby reroute link to now-active link 26B.

Figure 4A:
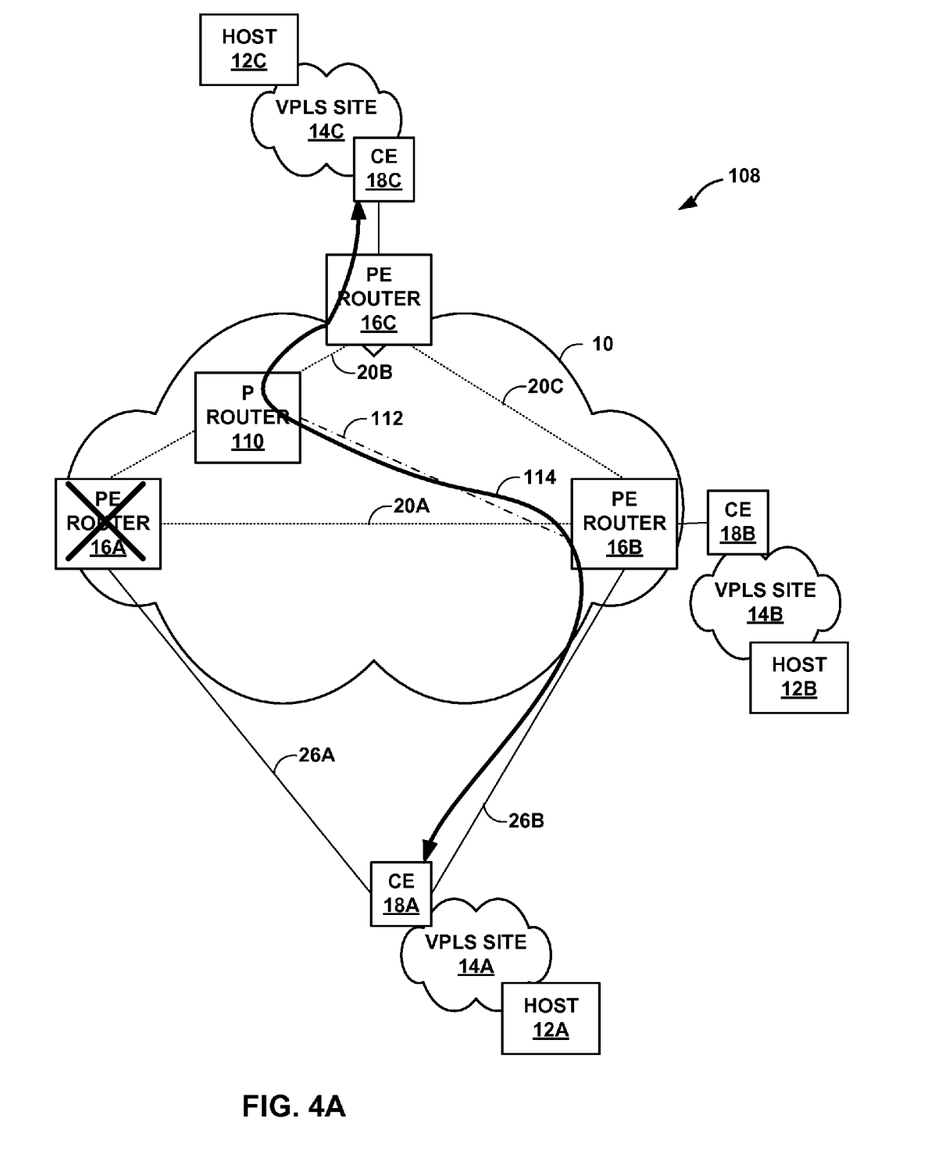
FIGS. 4A-4B are block diagrams illustrating another example SP network that includes devices configured to employ controlled switchover of multi-homed connections in the context of node protection in a BGP VPLS.

FIG. 4A is a block diagram illustrating another example SP network 108 that includes devices configured to employ controlled switchover of multi-homed connections in the context of node protection in a BGP VPLS. The controlled switchover mechanisms proposed herein can be seamlessly integrated with a solution, such as end-to-end restoration, for node fast failover. For further details on node protection and end-to-end restoration, see U.S. application Ser. No. 12/425,503 to Gredler et al., entitled "Egress Protection for Label Switched Paths," filed Apr. 17, 2009, the entire contents of which are incorporated by reference herein.

For node protection purposes, routers in SP network 108 establish a BPW from a provider router ("P router") 110 between PE routers 16A and 16C, where PE router 16A is the DF for VPLS site 14A. During a transition period after PE router 16A crashes, P router 110 sends traffic received from PE router 12C through BPW 112. P router 110 is not VPLS-aware. Traffic received by a first candidate backup PE router such as PE router 16B over the BPW 112 is mapped to the link to the CE router 18A associated with the multi-homing VPLS site 14A, with no MAC learning as long as the PE router 16B is in backup mode. A first candidate backup PE router is that backup PE router having the next highest priority for which it is assumed will become the next designated forwarder should the current designated forwarder lose its status. This traffic is not pushed by PE router 16B to the local VPLS forwarding domain, to prevent double count. After the transition period is complete, the traffic flows from PE router 16C to PE router 16B to CE router 18A.

Figure 4B:
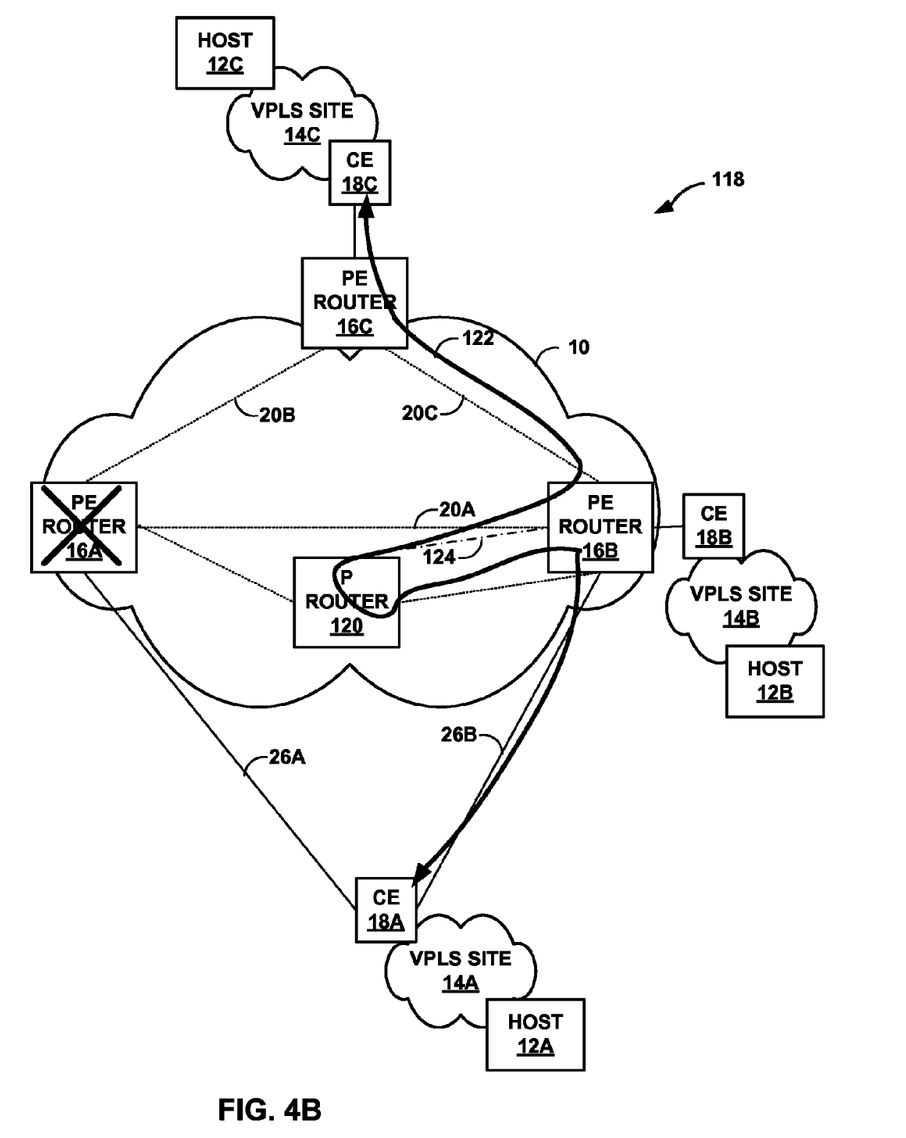

FIG. 4B is a block diagram illustrating another example SP network 118 that includes devices configured to employ controlled switchover of multi-homed connections in the context of node protection in a BGP VPLS. PE router 16A adds end-to-end protection on a BPW path 124 from the backup PE router 16B to a P router 120 on a path to the DF PE router 16A. P router 120 is the penultimate router before PE router 16B. Upon PE router 16A crashing, provider router ("P router") 120 reroutes the traffic 122 from PE router 16B onto the BPW path 124 back to the backup router PE router 16B. Backup PE router 16B puts any received traffic received from the end-to-end BPW path 124 into the VPLS and forwards the traffic to PE router 16C as if the traffic were received from CE router 18A associated with the VPLS site 14A. This is because the termination of the end-to-end BPW 124 is in the VPLS domain.

Although the examples set forth above include two multi-homed PE routers (e.g., PE router 16A and PE router 16B), the techniques described herein are readily applicable to situations having more than two multi-homed PE routers. The DF PE router may establish BPWs to each of the backup PE routers. The DF PE router can use the DF selection rules to anticipate which backup PE router will be the next DF candidate. Based on the expected next DF candidate, the current DF PE router can determine which established BPW to which to stitch the VPLS to upon a link failure. After the DF status is transferred to the new DF, all of the now-backup PE routers drop BPWs to the old DF and establish respective BPWs to the new DF. Upon receipt from the old DF PE router of an announcement of a status change, the remote PE router (e.g., PE router 16C) flushes its MAC table 60 and activates all PWs to all backup PE routers.

Although various aspects of the invention have been described above for purposes of example with respect to VPLS, the switchover mechanisms described above can also be applied in the context of other types of layer two VPNs (L2VPNs). Apart from the MAC learning, which is not applicable in certain other L2 VPN contexts, the same mechanisms for using a BPW can be used in a L2 VPN to provide a controlled sequence of events during switchover in a multi-homed VPLS situation. Both the backup and remote PE routers are configured to work in the "accept both/send one" mode. The non-DF PE router will accept traffic from both the L2 VPN PW and the BPW. At any moment, the non-DF PE router sends one copy of traffic, and at any moment, the remote PE router sends one copy of traffic. As soon as the remote and non-DF PE routers get the D-bit notification from the DF PE router, the remote and non-DF PE routers switch state and traffic to the new BPW. After time T, the multi-homed PE routers clean their states of the new DF. Further details regarding L2 VPNs may be found in U.S. Pat. No. 7,558,219 to Aggarwal et al., entitled "MULTICAST TREES FOR VIRTUAL PRIVATE LOCAL AREA NETWORK (LAN) SERVICE MULTICAST," filed on Aug. 26, 2005, the entire contents of which are incorporated by reference herein.

The various aspects described above, while described separately for ease of explanation, may be concurrently implemented in a network. For example, the node protection aspects may be employed at the same time as the general switchover mechanisms. Various embodiments of the invention have been described. These and other embodiments are within the scope of the following claims.

The invention claimed is:

1. A method comprising:

establishing a bi-directional pseudowire between a first provider edge (PE) router and a second PE router that are both associated with a multi-homed virtual private local area network service (VPLS) customer site associated with a VPLS domain, wherein the first PE router and the second PE router provide the same VPLS customer site with multi-homed, redundant connectivity to a network, wherein the first PE router has a multi-homing designated forwarder status relative to the VPLS customer site, and wherein the second PE router has a multi-homing backup forwarder status relative to the VPLS customer site, wherein the bi-directional pseudowire is established as an auxiliary standby bi-directional pseudowire external to the VPLS domain;

stitching, by the second PE router, the bi-directional pseudowire to a link from the second PE router to the VPLS customer site;

after establishing the bi-directional pseudowire, detecting a change in topology of the network with the first PE router, wherein the change in topology affects connectivity of the first PE router to the VPLS customer site associated with the VPLS domain; and in response to detecting the change in topology, automatically updating forwarding plane configuration of the first PE router to use the bi-directional pseudowire as an active interface within the VPLS domain for forwarding network traffic to the VPLS customer site;

after updating the forwarding plane configuration of the first PE router to use the bi-directional pseudowire as an active interface, sending, by the first PE router, a BGP advertisement to notify peer PE routers of the change in topology of the network, wherein the second PE router comprises one of the peer PE routers; and in response to the second PE router receiving the BGP advertisement from the first PE router, and by the second PE router:

breaking the stitching between the bi-directional pseudowire and the link to the VPLS customer site; and associating the link to the VPLS customer site with the VPLS domain as the active link for the VPLS customer site.

2. The method of claim 1, wherein the BGP advertisement comprises a Down-bit advertisement.

3. The method of claim 1, wherein the second PE router comprises a first candidate backup PE router for the VPLS customer site.

4. The method of claim 1, further comprising in response to receiving the BGP advertisement and by the second PE router, waiting a configurable time period before breaking the stitching between the bi-directional pseudowire and the link to the VPLS customer site.

5. The method of claim 1, wherein automatically updating forwarding plane configuration of the first PE router comprises the first PE router updating forwarding information within the first PE router to use the bi-directional pseudowire for sending VPLS traffic for the VPLS domain over the bi-directional pseudowire toward the VPLS customer site.

6. The method of claim 1, wherein establishing the bi-directional pseudowire comprises establishing label switched paths (LSPs) using a label distribution protocol to carry encapsulated layer two (L2) communications to and from the VPLS customer site.

7. The method of claim 1, further comprising:
establishing a second bi-directional pseudowire between the first PE router and a third PE router that provides the same multi-homed VPLS customer site with multi-homed, redundant connectivity to the network, wherein the third PE router has a multi-homing backup forwarder status relative to the VPLS customer site, wherein the second bi-directional pseudowire is established as an auxiliary standby bi-directional pseudowire external to the VPLS domain; and in response to detecting the change in topology, prior to updating the forwarding plane configuration, applying designated forwarding selection rules to determine which of the second PE router and the third PE router comprises a first candidate backup PE router; and upon determining that the second PE router comprises the first candidate backup PE router, updating the forwarding plane configuration of the first PE router to use the bi-directional pseudowire as the active interface.

8. The method of claim 1, further comprising:
establishing a second bi-directional pseudowire between a provider router and the second PE router, wherein the provider router comprises an intermediate device between the first PE router and a third PE router, wherein the provider router is not VPLS-aware, and wherein the provider router receives network traffic from the third router that is destined for the VPLS customer site;

with the provider router, detecting failure of the first PE router; and upon detecting the failure, automatically updating forwarding plane configuration of the provider router to use the second bi-directional pseudowire for forwarding to the second PE router the network traffic destined for the VPLS customer site.

9. The method of claim 8, further comprising:
receiving the network traffic on the second bi-directional pseudowire at the second PE router from the provider router; and mapping the received network traffic to a link from the second PE router to the VPLS customer network while performing no Media Access Control (MAC) address learning on the second bi-directional pseudowire while the second PE router has the backup forwarder status and without forwarding the network traffic as part of the VPLS domain.

10. The method of claim 1, further comprising:
establishing a second bi-directional pseudowire between a provider router and the second PE router, wherein the provider router comprises an intermediate device between the first PE router and the VPLS customer site, wherein the provider router is not VPLS-aware, and wherein the provider router receives network traffic from the VPLS customer site;

with the provider router, detecting failure of the first PE router; and upon detecting the failure, automatically updating forwarding plane configuration of the provider router to use the second bi-directional pseudowire for forwarding to the second PE router the network traffic received from the VPLS customer site.

11. The method of claim 10, further comprising:
receiving the network traffic on the second bi-directional pseudowire at the second PE router from the provider router; and injecting the received network traffic into the VPLS domain as if the traffic were received directly from the VPLS customer site.

12. A first provider edge (PE) router comprising:
a processor;
a packet forwarding engine configured to establish a bi-directional pseudowire between the first PE router and a second PE router, wherein the first PE router and the second PE router are both associated with a multi-homed virtual private local area network service (VPLS) customer site associated with a VPLS domain, wherein the first PE router and the second PE router provide the same VPLS customer site with multi-homed, redundant connectivity to a network, wherein the first PE router has a multi-homing designated forwarder status relative to the VPLS customer site, and wherein the second PE router has a multi-homing backup forwarder status relative to the VPLS customer site, wherein the bi-directional pseudowire is established as an auxiliary standby bi-directional pseudowire external to the VPLS domain; and a routing engine executing on the processor, wherein the routing engine is configured to, after establishing the bi-directional pseudowire, detect a change in topology of the network with the first PE router, wherein the change in topology affects connectivity of the first PE router to the VPLS customer site associated with the VPLS domain, wherein the packet forwarding engine is configured to, in response to the routing engine detecting the change in topology, automatically update forwarding plane configuration of the first PE router to use the bi-directional pseudowire as an active interface within the VPLS domain for forwarding network traffic to the VPLS customer site, wherein the routing engine is configured to execute a routing protocol that generates a BGP advertisement to notify peer PE routers of the change in topology of the network, wherein the packet forwarding engine outputs the BGP advertisement to the peer PE routers after updating the forwarding plane configuration to use the bi-directional pseudowire as an active interface, wherein the second PE router comprises one of the peer PE routers, wherein the BGP advertisement triggers the second PE router to break stitching between the bi-directional pseudowire and a link to the VPLS customer site and associate the link to the VPLS customer site with the VPLS domain as an active link for the VPLS customer site.

13. The first PE router of claim 12, wherein the BGP advertisement comprises a Down-bit advertisement.

14. The first PE router of claim 12, further comprising: forwarding information maintained by the packet forwarding engine, wherein the packet forwarding engine is configured to update the forwarding information to specify that the bi-directional pseudowire is used for sending VPLS traffic for the VPLS domain toward the VPLS customer site.

15. The first PE router of claim 12, further comprising: a label distribution protocol executing within a control unit of the first PE router, wherein the label distribution protocol is configured to establish label switched paths (LSPs) using a label distribution protocol to carry encapsulated layer two (L2) communications to and from the VPLS customer site.

16. A non-transitory computer-readable storage medium comprising instructions for causing a programmable processor to:
establish a bi-directional pseudowire between a first provider edge (PE) router and a second PE router that are both associated with a multi-homed virtual private local area network service (VPLS) customer site associated with a VPLS domain, wherein the first PE router and the second PE router provide the same VPLS customer site with multi-homed, redundant connectivity to a network, wherein the first PE router has a multi-homing designated forwarder status relative to the VPLS customer site, and wherein the second PE router has a multi-homing backup forwarder status relative to the VPLS customer site, wherein the bi-directional pseudowire is established as an auxiliary standby bi-directional pseudowire external to the VPLS domain;
after establishing the bi-directional pseudowire, detect a change in topology of the network with the first PE router, wherein the change in topology affects connectivity of the first PE router to the VPLS customer site associated with the VPLS domain;
in response to detecting the change in topology, automatically update forwarding plane configuration of the first PE router to use the bi-directional pseudowire as an active interface within the VPLS domain for forwarding network traffic to the VPLS customer site; and
after updating the forwarding plane configuration to use the bi-directional pseudowire as an active interface, send a BGP advertisement to notify peer PE routers of the change in topology of the network, wherein the BGP advertisement triggers the second PE router to break stitching between the bi-directional pseudowire and a link to the VPLS customer site and associate the link to the VPLS customer site with the VPLS domain as an active link for the VPLS customer site.

17. A system comprising:
a first virtual private local area network service (VPLS) customer site associated with a VPLS domain providing VPLS services to the VPLS customer site;
a first provider edge (PE) router associated with the VPLS customer site; and
a second PE router associated with the VPLS customer site, wherein the first PE router and the second PE router provide the same VPLS customer site with multi-homed connections for the VPLS customer site to the VPLS domain, wherein the first PE router has a multi-homing designated forwarder status relative to the VPLS customer site, and wherein the second PE router has a multi-homing backup forwarder status relative to the VPLS customer site,
wherein the first PE router and the second PE router are configured to establish a bi-directional pseudowire between the first PE router and the second PE router, wherein the bi-directional pseudowire is established as an auxiliary standby bi-directional pseudowire external to the VPLS domain,
wherein the second PE router is configured to stitch the bi-directional pseudowire to a link from the second PE router to the VPLS customer site,
wherein the first PE router is configured to, after establishing the bi-directional pseudowire, detect a change in topology of the network that affects connectivity of the first PE router to the VPLS customer site, and wherein, in response to the first PE router detecting the change in topology, the first PE router is configured to automatically update forwarding plane configuration of the first PE router to use the bi-directional pseudowire as an active interface within the VPLS domain for forwarding network traffic to the VPLS customer site,
wherein the first PE router is configured to, after updating the forwarding plane configuration to use the bi-directional pseudowire as an active interface, send a BGP advertisement to notify peer PE routers of the change in topology of the network, wherein the second PE router comprises one of the peer PE routers, and
wherein in response to the second PE router receiving the BGP advertisement from the first PE router, the second PE router breaks the stitching between the bi-directional pseudowire and the link to the VPLS customer site, and associates the link to the VPLS customer site with the VPLS domain as the active link for the VPLS customer site.

18. The system of claim 17, wherein the second PE router comprises a first candidate backup PE router for the VPLS customer site.

19. The system of claim 17, wherein the second PE router is configured to, after the second PE router receives the BGP advertisement, wait a configurable time period before breaking the stitching between the bi-directional pseudowire and the link to the VPLS customer site.

20. The system of claim 17, further comprising:
a third PE router provides the same multi-homed VPLS customer site with multi-homed, redundant connectivity to the network, wherein the third PE router has a multi-homing backup forwarder status relative to the VPLS customer site, wherein the third PE router is configured to establish a second bi-directional pseudowire between the first PE router and a third PE router, wherein the second bi-directional pseudowire is established as an auxiliary standby bi-directional pseudowire external to the VPLS domain,
wherein the first PE router is configured to, in response to detecting the change in topology and prior to updating the forwarding plane configuration, apply designated forwarding selection rules to determine which of the second PE router and the third PE router comprises a first candidate backup PE router, and wherein the first PE router is configured to, upon determining that the second PE router comprises the first candidate backup PE router, update the forwarding plane configuration of the first PE router to use the bi-directional pseudowire as the active interface.

21. The system of claim 20, further comprising:
a third PE router; and
a provider router positioned between the first PE router and a third PE router, wherein the provider router is not VPLS-aware, and wherein the provider router receives network traffic from the third router that is destined for the VPLS customer site;
wherein the second PE router is configured to establish a second bi-directional pseudowire between the provider router and the second PE router,
wherein the provider router is configured to, upon detecting failure of the first PE router, automatically update forwarding plane configuration of the provider router to use the second bi-directional pseudowire for forwarding to the second PE router the network traffic destined for the VPLS customer site.

22. The system of claim 21, wherein the second PE router is configured to receive the network traffic on the second bi-directional pseudowire from the provider router, and map the received network traffic to a link from the second PE router to the VPLS customer network while performing no Media Access Control (MAC) address learning on the second bi-directional pseudowire while the second PE router has the backup forwarder status and without forwarding the network traffic as part of the VPLS domain.

23. The system of claim 17, further comprising:
a provider router positioned between the first PE router and the VPLS customer site, wherein the provider router is not VPLS-aware, and wherein the provider router receives network traffic from the VPLS customer site,
wherein the second PE router is configured to establish a second bi-directional pseudowire between the provider router and the second PE router
wherein the provider router is configured to, upon detecting failure of the first PE router, automatically update forwarding plane configuration of the provider router to use the second bi-directional pseudowire for forwarding to the second PE router the network traffic received from the VPLS customer site.

24. The system of claim 23,
wherein the second PE router is configured to receive the network traffic on the second bi-directional pseudowire from the provider router, and inject the received network traffic into the VPLS domain as if the traffic were received directly from the VPLS customer site.

* * * * *